Dec. 16, 1958 S. GUSTAFSSON 2,864,459
RAPPING SYSTEM FOR ELECTROFILTERS
Filed Oct. 22, 1956
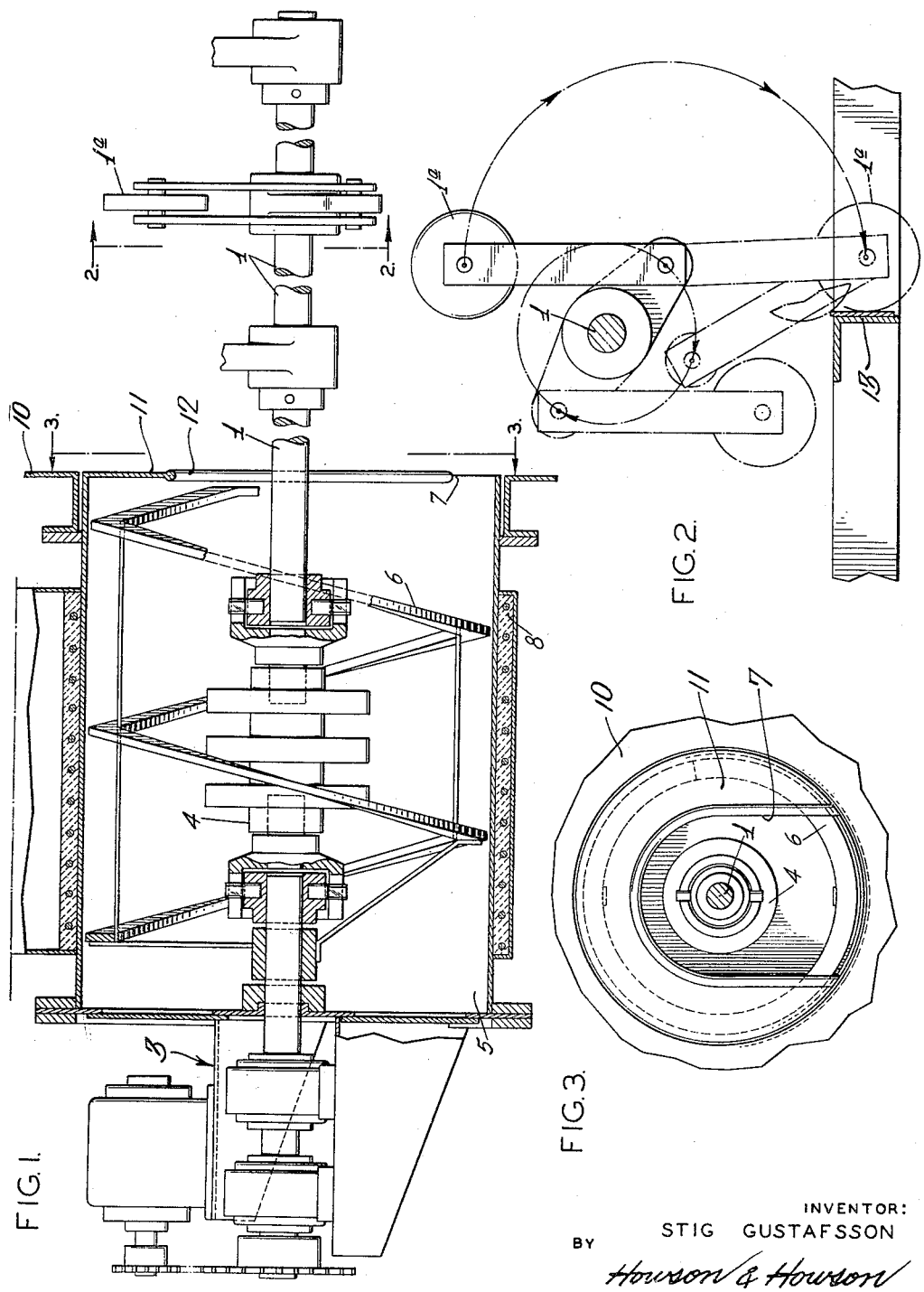
INVENTOR:
STIG GUSTAFSSON
BY Howson & Howson
ATTYS.

United States Patent Office 2,864,459
Patented Dec. 16, 1958

2,864,459

RAPPING SYSTEM FOR ELECTROFILTERS

Stig Gustafsson, Jonkoping, Sweden, assignor to A. B. Svenska Flaktfabriken, Kungsgatan, Stockholm, Sweden Application October 22, 1956, Serial No. 617,542

Claims priority, application Sweden October 24, 1955

3 Claims. (Cl. 183—7)

The present invention relates to a rapping system for discharge electrodes in electrofilters having hammering devices consisting of a rotating, preferably horizontal axle equipped with hammering means, said axle being rotated by driving means mounted on the casing of the electrofilter. The driving means is electrically insulated from the axle by means of an intermediate insulated coupling. Efforts have been made to simplify the previously used complicated driving means for rotating the axle which is a part of the hammering device of this type.

In electrofilters provided with hammering means driven in the above described manner interruptions in operation often occur, for instance because dust, emanating from the gas—depending on the field distribution in the filter—has a tendency to accumulate between the axle and the chamber surrounding said axle.

The present invention relates to a simple and suitable arrangement for the elimination of said drawback and makes the above mentioned, simplified driving arrangement possible.

The apparatus according to the invention is characterized in that the insulating coupling is enclosed in a separate chamber connected to the filter and that a conveyor in form of a screw worm, scraper or the like, is arranged in said chamber and that the conveyor is driven by the driving means and surrounds the insulated coupling at the required voltage distance. The conveyor transports dust which emanates from the gas and accumulates in the chamber towards an outlet opening arranged in the chamber.

The chamber is suitably heated by means of a heating element to eliminate the possibility of condensation which easily occurs on the insulated coupling when the temperature is too low in the chamber, said condensation causing an electrical leak on the coupling.

The invention will now be more fully described with reference to the accompanying drawing, which shows an exemplified embodiment of the invented arrangement, in which:

Fig. 1 is a view in section with portions broken out illustrating the hammer, axle, and chamber of the present invention;

Fig. 2 is a sectional view taken on the line 2—2 of Fig. 1; and,

Fig. 3 is a sectional view taken on the line 3—3 of Fig. 1.

In the accompanying drawing Figure 1 designates a rotating axle equipped with a hammer 1a. The axle is rotated by means of a driving device 3. Said driving device is electrically insulated from the axle by means of a separate insulating coupling 4. 5 designates a chamber connected to the filter 10 and 6 designates a screw worm being rotated by the driving device 3, said screw worm during its rotation transporting away dust from the chamber towards an outlet opening 7. Said opening is suitably designed as a sector-shaped opening in the end wall 11, and extends down to the bottom of the chamber. The edges of the opening are, with respect to the eliminating of the so called point action, suitably provided with a round bar 12 extending along the edge of the opening. In the drawing, reference number 8 designates a heating device, for instance in form of an electric heater. The purpose of using these heating devices is to eliminate the possibility of condensation in the chamber.

The action of the hammer 1a is shown in broken lines in Fig. 2. The action is conventional. The rotation of the axle 1 causes the hammer to travel slowly upwardly, and when it passes the center of the axle 1, it falls rapidly, hitting against the frame 13 which suspends the collecting electrode in the electrofilter 10.

What I claim is:

1. In a rapping system for an electrofilter having a housing enclosing the high-voltage collecting electrodes, hammer means operable to rap said collecting electrodes while energized, a separate chamber attached to said housing and communicating therewith through an opening in the wall of said housing, said hammering means comprising a shaft mounting said hammering means and projecting through said opening and into said separate chamber, an insulating coupling within said chamber, means to drive said coupling to actuate said hammering means, and an annular screw worm scraper in said chamber surrounding said coupling in spaced relation thereto to electrically insulate said shaft and said scraper, said scraper engaging the walls of said separate chamber and being connected to and driven by said drive means to scrape the walls of said chamber and convey the dust accumulated in said chamber out thereof through said opening into the electrofilter.

2. In a system according to claim 1 wherein said shaft, insulating coupling and drive means are in horizontal axial alignment within said chamber.

3. In a system according to claim 1 including heating means for said chamber mounted in an external jacket covering said chamber.

References Cited in the file of this patent

UNITED STATES PATENTS

| 1,463,352 | Weiskopf | July 31, 1923 |

FOREIGN PATENTS

| 505,794 | Germany | Aug. 27, 1930 |
| 565,152 | Germany | Oct. 17, 1933 |